United States Patent [19]

Shickel

[11] Patent Number: 4,784,891
[45] Date of Patent: Nov. 15, 1988

[54] INSULATION

[76] Inventor: Robert J. Shickel, P.O. Box 846, Essex, Conn. 06426

[21] Appl. No.: 151,924
[22] Filed: Feb. 3, 1988
[51] Int. Cl.⁴ .............................................. B32B 3/26
[52] U.S. Cl. .................................... 428/137; 428/138; 428/284; 428/285; 428/314.4; 428/316.6; 428/317.1; 428/319.1
[58] Field of Search ............... 428/137, 138, 284, 285, 428/314.4, 314.8, 316.6, 317.1, 317.7, 319.1

[56] References Cited

U.S. PATENT DOCUMENTS

| 3,126,978 | 3/1964 | Bergstrom | 428/138 |
| 3,770,560 | 11/1973 | Elder et al. | 428/316.6 |
| 3,881,489 | 5/1975 | Hartwell | 428/137 |
| 4,205,110 | 5/1980 | Jean | 428/213 |
| 4,479,994 | 10/1984 | Berg | 428/316.6 |
| 4,608,298 | 8/1986 | Klaff | 428/316.6 |

Primary Examiner—William J. Van Balen
Attorney, Agent, or Firm—McCormick, Paulding & Huber

[57] ABSTRACT

An insulation article usable either by itself or to provide an increased efficiency to a fibrous insulating medium comprises a first plastic sheet with closed cells of entrapped air bonded to a metal foil sheet in turn bonded to a layer formed from a sheet of paper or other moisture absorbing material. Passages are formed through each of the layers to permit the passage of vapor and to regulate the flow of thermal energy.

15 Claims, 3 Drawing Sheets

INSULATION

BACKGROUND OF THE INVENTION

The present invention resides in an improvement in insulation, and deals more particularly with an insulation article usable by itself as a thermal barrier and vapor disperser or with a fibrous medium to increase the efficiency of the fibrous medium as a thermal barrier and vapor disperser.

In insulation systems inhibiting the escape of thermal energy from a warm environment into a colder environment, use of a fibrous medium such as fiberglass, mineral wool, slag wool or rock wool to form a thermal barrier is well known. Typically the fibrous medium is placed between studs in a wall or ceiling system and have at least one outwardly or inwardly directed face covered by an exterior or interior wall. While these fibrous mediums alone do provide significant resistance to heat passage, it is also common to use a foil facing with such a medium to increase its resistance to thermal energy passage. The facing is usually bonded to the side of the fibrous medium oriented toward the thermal source thus reflecting otherwise escaping heat passing through the medium. While the foil facing does provide the fibrous medium with an increased thermal resistance, its orientation toward the thermal source also enables it to function as a vapor barrier so that water vapor and other vapors generated within the insulated environment may be prohibited from being trapped in the fibrous medium by the facing. Alternately, if the facing is bonded to the fibrous medium oriented away from the thermal source, it would still reflect otherwise escaping heat passing through the medium. However, such vapors generated within the insulated environment would likely become trapped within the fibrous medium by the facing and be prohibited from diffusing into the outside environment. A number of problems may arise from such trapped vapors. In a living space, for example, harmful vapors may be emitted by domestic fluids and sprays and may linger in the air when not allowed to escape through the medium. Windows and doors are usually closed, if not sealed, during winter months and thus further contribute to the entrapment of vapors. Generally, much of the vapor in an insulated environment is water vapor generated by domestic functions such as cooking and showering. When water vapor is not allowed to diffuse out of the fibrous insulation medium, the entrapped vapor fills spaces otherwise occupied by insulating air and lowers the ability of the medium to function as a thermal barrier. Furthermore, the entrapped water vapor may condense into water droplets and cause rot, mildew or other water damage of the adjacent wall or roof structure.

Accordingly an object of the present invention is to provide an article of insulation usable by itself as a thermal barrier and vapor disperser, but especially advantageously usable with a fibrous medium to increase the efficiency of the fibrous medium as both a thermal barrier and a vapor disperser.

Another object of the present invention is to provide a means for controllably diffusing water vapor contained in a fibrous insulation medium into an outside environment.

Still another object of the present invention is to provide an insulation article which may be formed independently of a fibrous medium and which can be used to enhance the insulating efficiency of a fibrous medium with which it is later associated.

SUMMARY OF THE INVENTION

The present invention resides in a sheet type insulating article usable by itself or with a fibrous medium to reflect and hold otherwise escaping thermal energy while allowing vapors contained within the fibrous medium to pass through to an outside environment. The article is formed as a three-layer laminate. Each layer is made of a different material accomplishing a particular function. The first layer is a low density flexible plastic sheet of foam or film having closed cells of entrapped air and having one face intended, in use with a fibrous medium, to be positioned adjacent the cold face of the fibrous medium. The second layer is a metal foil sheet having one surface fixed to the other face of the plastic sheet. This foil sheet reflects otherwise escaping thermal energy passing through the fibrous medium and the first layer back into the first layer and the fibrous medium. The third layer is formed from a moisture absorbing material such as paper and is fixed to the other surface of the foil sheet. This moisture absorbing layer has an outer surface directed toward the cold or outside environment. Perforations spaced apart over the extent of the article pass through all three layers. Vapor collecting within the fibrous medium passes through these perforations and is diffused into the outside environment. The perforations which by size, shape and orientation in the invention relate to the specific materials used in the fibrous medium and the improvement also serve to regulate the rate of thermal energy permitted to pass through the fibrous medium and the remainder of the improvement. The plastic sheet which tends to become heated due to the reflected thermal energy prevents moisture from condensing on the inner surface of the foil. Some water vapor may however condense into liquid water after passing through the foil layer and, if so, tends to be absored by the moisture absorbing material comprising the outer or cold side layer of the article. This absorbed water spreads over a relatively large area of the moisture absorbing material and therefore is readily evaporated into the air located adjacent the outer surface of the outer layer.

DETAILED DESCRIPTION OF THE PREFERRED EMBODIMENTS

Figure 1:
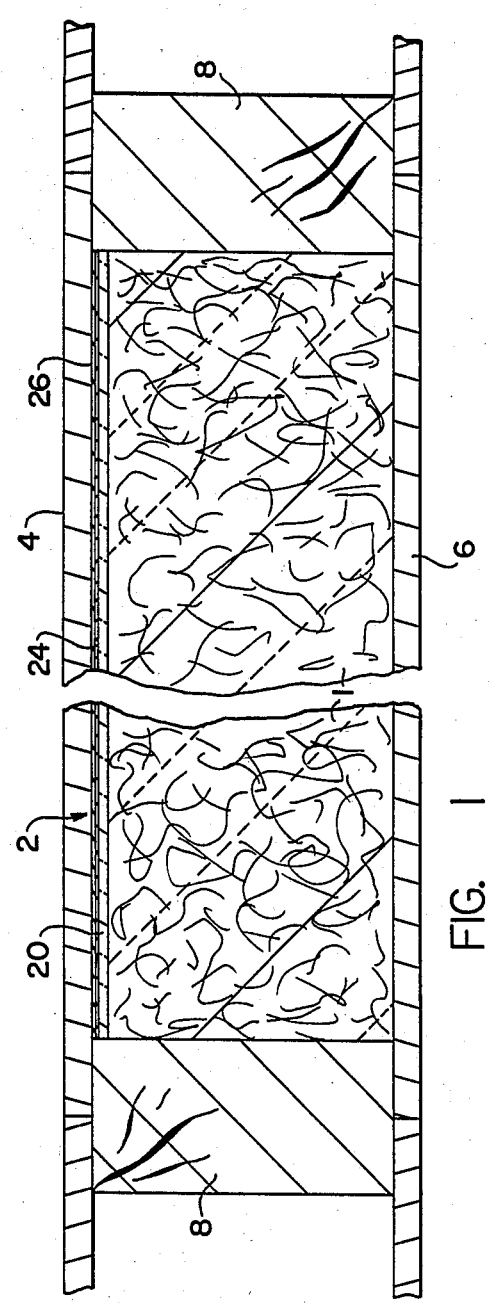
FIG. 1 is a horizontal sectional view taken through a wall system utilizing an insulation article embodying the present invention.
Figure 2:
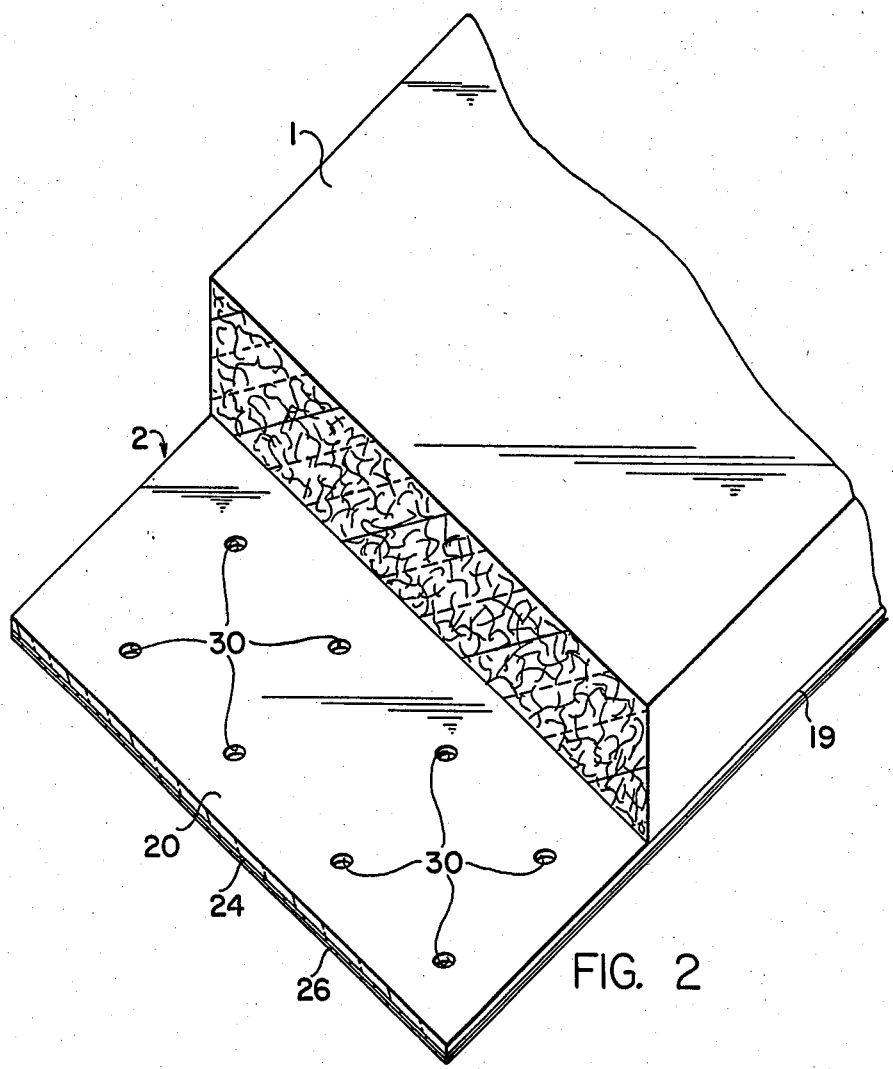
FIG. 2 is a perspective view of a fibrous insulation medium bonded with the insulation article of FIG. 1.

In FIG. 1, an insulation article 2 embodying the present invention is shown in combination with a fibrous medium 1, both of which are installed in a wall system, such as that of a house, having an exterior wall 4 exposed to an outside cold side environment and an interior wall 6 exposed to an inside or warm side environment. Vertical studs 8 are spaced a fixed distance apart and, along with other similar studs not shown, support the walls 6 and 4 in a spaced relationship. The insulation article 2 and the fibrous medium 1 are placed between the studs 8 and produce a resistance to thermal heat passage. As shown in FIG. 2, the insulation article 2 is bonded directly to the fibrous medium 1 by an adhesive layer 19 to form a unitary product 17 which can be manufactured, sold and installed as such. Such product may also, if desired, include some means to aid in holding itself in place between a pair of studs, such as a layer of paper (not shown) bonded to the upper side of the medium 1 as seen in FIG. 2 with margins extending laterally outwardly from each side edge of the medium for stapling to the studs. Alternatively, the insulation article 2 can be made, sold and installed as a separate element independently of the fibrous medium. In some instances the article 2 may by itself provide adequate insulation, but generally it is preferable that it be used with some other insulation material such as the fibrous medium 1.

Figure 3:
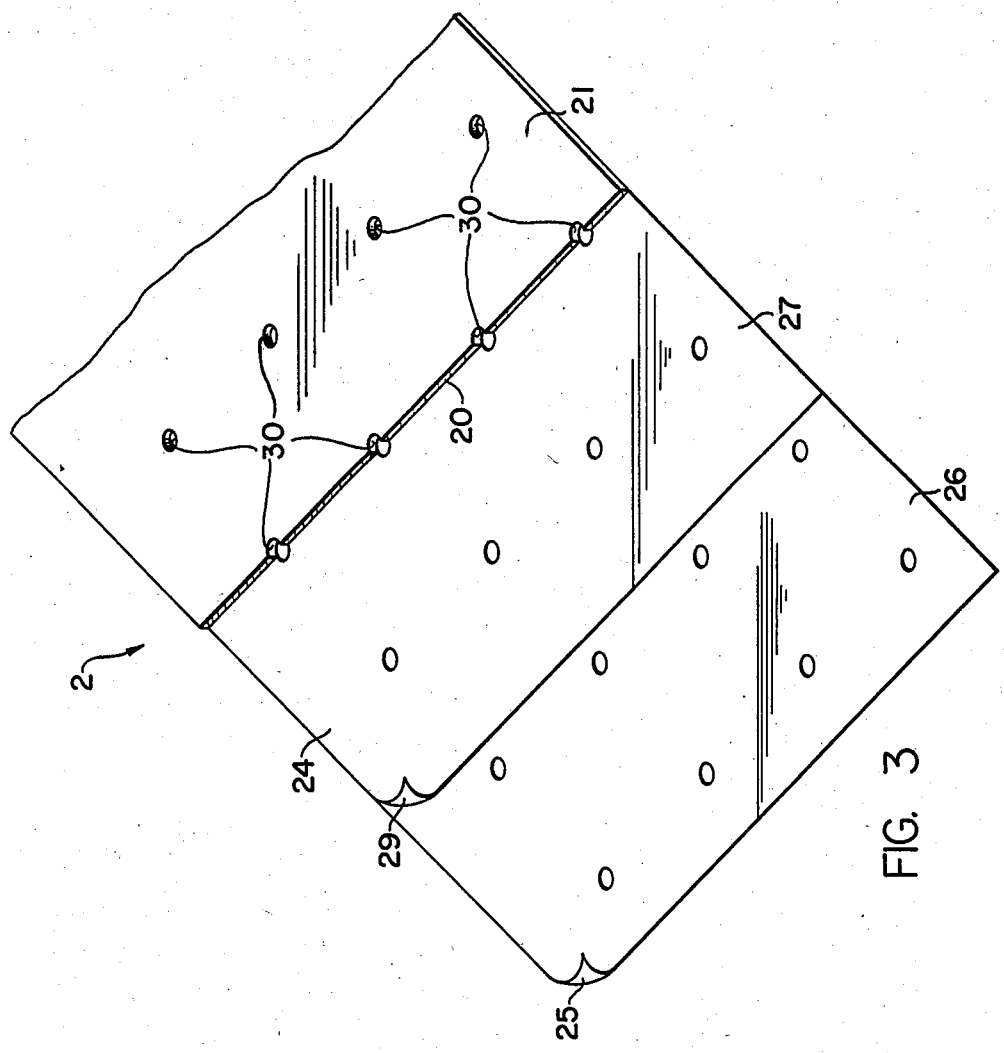
FIG. 3 is a fragmentary perspective view of FIG. 1 by itself with portions of the first and second layers being cut away to better show the other layers.

FIG. 3 illustrates in more detail the three-layer insulation article 2. The first layer 20 is a sheet of plastic, preferably flexible and with closed cells, such as foamed polyethylene. It could also be comprised of some other type of plastic sheet containing closed cells entrapping air, such as, for example, two superimposed sheets of unfoamed polyethelene spot bonded together to form trapped air pockets or bubbles. The outer or upper surface 21 of the layer 20, as seen in FIG. 3, is the one which in use is positioned toward the warm side environment. Because of the entrapped air contained within the closed cells, this layer provides an insulation blanket or thermal resistance between the cold and warm side environments.

The second layer of the article 2, as shown in FIG. 3, is a foil sheet 24 of metal such as aluminum. The sheet 24 is fixed to the first layer 20 by suitable means such as a thin layer of adhesive. Thermal energy otherwise escaping through the fibrous medium 1 and the layer of low density plastic 20 is reflected by the foil sheet 24 back into the layer 20 and medium 1, thus preserving heat retention reservoirs in the layer 20 and medium 1. As the escaping thermal energy is reflected back toward the warm side environment by the foil 24, a thermal energy transfer is accomplished with regard to the air entrapped in the cells of the plastic layer 20 to heat such air. This, therefore causes the layer 20 to act as a heated blanket confronting the cold side of the fibrous medium and enabling the medium 1 to retain a higher level of thermal energy. It also tends to inhibit condensation of water on the foil sheet 24.

The third layer of the article 2 is a moisture absorbing sheet 26 of material, such as paper, which is fixed to the lower surface 29 of the foil sheet 24 as by a thin layer of adhesive. The lower surface 25 of the sheet 26 in use is directed toward the cold side environment and is spaced from the warm side environment by the thermal blanket developed by the plastic layer 20 and by the foil sheet 24.

As has been previously discussed, an object of the invention to also allow for the venting of vapors from the warm side to the cold side environment. For this purpose, perforations 30 are formed through the thickness of the insulation article 2. The perforations 30 are in general equidistantly spaced apart and are sized dependent on the materials used to permit adequate passage of vapor and to regulate the flow of thermal energy through the article 2, while nevertheless being small enough so that the loss of thermal energy through them is not substantial. For example, the perforations may be about $\frac{1}{4}''$ in diameter, arranged in rows spaced about 2" from each other, and spaced about 2" from each other in each row so as to provide about 36 perforations per square foot of the article arranged substantially equidistant from one another. However, these measurements may vary with the perforations being possibly anywhere from about $\frac{1}{8}''$ to about $\frac{1}{2}''$ in diameter, with the rows being spaced from each other by a measurement anywhere from about 1" to about 3", and with the holes in each row being spaced from each other anywhere from about 1" to about 3", there then being anywhere from about 16 to 144 substantially equidistantly spaced holes per square foot of the article. The foil layer 24 and paper layer 26 are each relatively thin, preferably on the order of 3 mils thick or less. The foil layer 24 indeed may be as thin as $\frac{1}{4}$ mil or less. The plastic layer may be any one of various different thicknesses, but preferably is within a range of 1/16" to $\frac{1}{2}''$ thick.

As mentioned, the insulation article 2 may be used in the manner shown in FIG. 1. The surface 25 of the paper layer 26 confronts the interior surface of the exterior wall 4. However, it is only loosely pressed, if at all, against the wall 4 so that some space preferably exists between the article and the wall to allow air to circulate over the outer surface 25 of the layer 26. The thermal blanket effect of the first layer 20 also inhibits the condensation of water vapor onto the foil surface 27. Thus, if vapor passes through the perforations 30 in the foil 24 it may thereafter condense. If such condensation occurs the liquid water formed is absorbed by the outer paper layer 26 in the vicinity of the perforations 30. This moisture spreads through the material of the layer and thereby disperses itself over a relatively large area of the outer face 25 of the layer 26 from which it then evaporates into the adjacent air.

As above described, one of the applications of the invention is to employ the insulation article 2 as a facing bonded to one surface of a fibrous medium 1 as in FIG. 2. The fibrous medium 1 is formed from commonly utilized materials such as fiberglass, mineral wool, slag wool or rock wool. An adhesive coating 19 may be applied between the surface 21 of the foam plastic layer 20 and the adjacent face of the medium 1 to bond the insulation article 2 to the medium. A thin adhesive layer may also be applied between the layers of the insulation article 2 to bond these layers to one another. It should be appreciated then, that the insulation article 2 is thin and flexible and when bonded to the fibrous medium 1 does not impede the fibrous medium 1 from being rolled for packaging or flexed for installation or other purposes.

In the foregoing a preferred embodiment of the invention has been described. It should be understood, however, that numerous modifications and substitutions may be made without departing from the spirit of the invention. In particular, the insulation article 2 may in some cases be used without the presence of a fibrous medium. In one such application the article 2 may be used as an insulating wrapper for products emitting vapor and/or thermal energy. Also, although the insulation article 2 and the fibrous medium 1 is shown in FIG. 2 in a wall structure, it should also be understood that the insulation article 2 need not always cooperate with an exterior wall 4, but rather the outer layer 26 can be directly exposed to a cold side environment such as in the case of a ceiling insulation system. Accordingly, the invention has been described by way of illustration rather than limitation.

I claim:

1. In combination with a fibrous insulation medium having a face oriented toward a cold side environment and an opposite face oriented toward a warm side environment, an article providing increased efficiency to said medium as both a thermal barrier and a vapor disperser, said article comprising:
   a first layer of material formed by a plastic sheet having closed cells of entrapped air with a first surface and a second opposite surface with said first surface being positioned adjoined said cold side face of said medium;
   a second layer formed by a metal foil sheet having a first surface and an opposite second surface, said first surface of said foil sheet being fixed to said second surface of said first layer so that said foil sheet is spaced from said medium by said first layer; and
   a third layer formed from a moisture absorbing sheet having a first surface and a second opposite surface, said first surface of said third layer being fixed to said second surface of said foil sheet and said second surface of said third layer being directed toward said cold side environment;
   said first, second and third layers further having passages extending therethrough from said first side of said first layer to said second side of said third layer to allow vapor collected within said fibrous medium to pass through said article and to regulate the passage of thermal energy through the fibrous medium and the said article.

2. The combination as defined in claim 1 wherein said passages are perforations passing through said three layers and substantially regularly distributed over said faces of said layers.

3. The combination as set forth in claim 2 wherein said low density plastic sheet forming said first layer is one having closed cells.

4. The combination as set forth in claim 3 wherein said foil sheet is formed from aluminum foil and said fibrous medium is formed from fiberglass.

5. The combination as set forth in claim 4 wherein said third layer is formed from moisture absorbing paper, and wherein said first layer first surface is bonded to said medium cold side face.

6. The combination as set forth in claim 1 wherein said first layer surface is bonded to said medium cold side face.

7. An article of insulation comprising:
   a first layer of material formed from a plastic sheet having closed cells of entrapped air and having a first surface and an opposite second surface;
   a second layer formed by a metal foil sheet having a first surface and an opposite second surface, said foil sheet first surface being bonded to said first layer second surface; and
   a third layer formed by a sheet of moisture absorbing material having a first surface and an opposite second surface, said third layer first surface being bonded to said foil sheet second surface,
   said first, second and third layers having passages extending therethrough from said first side of said first layer to said second side of said third layer to allow the passage of vapor through said article and to regulate the passage of thermal energy through the article of insulation.

8. An article as defined in claim 7 wherein said passages are perforations passing through said three layers and substantially regularly distributed over said surfaces of said layers.

9. An article as defined in claim 7 wherein said third layer is formed by paper and said second layer formed by aluminum foil.

10. An article as defined in claim 7 wherein said first layer is made of a closed cell foamed plastic material.

11. An article as defined in claim 10 wherein said plastic material is foamed polyethylene.

12. An article as defined in claim 7 wherein said first and second layers are on the order of 3 mils thick or less, said first layer has a thickness of between about 1/16" and ½", and said passages are perforations extending through said three layers and having diameters between about ⅛" to about ½" and arranged substantially equidistantly from one another with there being from about 16 to about 144 perforations per square foot of said article.

13. An article as defined in claim 12 wherein said first layer is made from a foamed plastic material.

14. An article as defined in claim 13 wherein said first layer is made of foamed polyethylene.

15. An article as defined in claim 13 wherein said second layer is made of aluminum foil and said third layer is made of paper.

* * * * *